United States Patent
Cote et al.

(10) Patent No.: US 8,340,800 B2
(45) Date of Patent: Dec. 25, 2012

(54) MONITORING A PROCESS SECTOR IN A PRODUCTION FACILITY

(75) Inventors: William Cote, Poughquag, NY (US); Michael P. Guse, Hopewell Junction, NY (US); Mark E. Lagus, Stanfordville, NY (US); James Rice, Danbury, CT (US); Yunsheng Song, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 716 days.

(21) Appl. No.: 12/175,018

(22) Filed: Jul. 17, 2008

(65) Prior Publication Data

US 2010/0017010 A1    Jan. 21, 2010

(51) Int. Cl.
*G06F 19/00* (2011.01)
(52) U.S. Cl. .................. 700/110; 700/121; 702/84
(58) Field of Classification Search ............ 700/32, 700/109, 110, 121; 702/84; 716/4; 714/25
See application file for complete search history.

(56) References Cited

U.S. PATENT DOCUMENTS

| 5,896,294 | A | 4/1999 | Chow et al. |
| 7,092,786 | B2 * | 8/2006 | Yasugi et al. ............ 700/174 |
| 2006/0171221 | A1 | 8/2006 | Mollat et al. |
| 2006/0282189 | A1 * | 12/2006 | Akisawa et al. .......... 700/110 |
| 2007/0219738 | A1 | 9/2007 | Weiher et al. |
| 2007/0280526 | A1 | 12/2007 | Malik et al. |

* cited by examiner

*Primary Examiner* — Mohammad Ali
*Assistant Examiner* — Sheela S Rao
(74) *Attorney, Agent, or Firm* — Cantor Colburn LLP; Ian MacKinnon

(57) ABSTRACT

Monitoring a process sector in a production facility includes establishing a tool defect index associated with a process sector in the production facility. The tool defect index includes a signal representing a defect factor associated with a tool in the process sector. Monitoring the process also requires determining whether the defect factor is a known defect factor or an unknown defect factor, and analyzing a unit from the tool if the defect factor is an unknown defect factor. Monitoring the process further requires identifying at least one defect on the unit from the tool, establishing that the at least one defect is a significant defect, determining cause of the significant defect, and creating an alert indicating that the tool associated with the process sector is producing units having significant defects.

19 Claims, 5 Drawing Sheets

MONITORING A PROCESS SECTOR IN A PRODUCTION FACILITY

BACKGROUND

Controlling quality is an important part of any production process. In semiconductor production, it is important to reduce and control defects on semiconductor components. Conventionally, semiconductor manufacturing facilities employ a particle-per-wafer pass (PWP) defect control to measure defects on monitor wafers at various points along a production line. PWP defect control utilizes various monitors to automatically count defects on the monitor wafers. The monitors provide quantitative and qualitative information about any defects detected on the monitor wafers.

The PWP defect control is a statistical process control (SPC) that detects and monitors defect trends and triggers alarms when defect limits exceed statistically determined SPC limits. Conventional monitoring systems monitor a single process in an overall production system and provide feedback to a user or process engineer regarding the process monitored. The user or process engineer reviews the feedback to determine what corrective action, if any, is required for the monitored process.

SUMMARY

Exemplary embodiments of the invention include establishing a tool defect index associated with a process sector in a production facility. The tool defect index includes a signal representing a defect factor associated with at least one tool in the process sector. The exemplary embodiments also include determining whether the defect factor associated with the at least one tool is a known defect factor or an unknown defect factor, and analyzing at least one unit from the at least one tool if the defect factor associated with the at least one tool is an unknown defect factor. The exemplary embodiments further include identifying at least one defect on the at least one unit from the at least one tool, establishing that the at least one defect is a defined significant defect, determining a cause of the defined significant defect, and creating an alert indicating that the at least one tool associated with the process sector is producing units includes at least one significant defect.

System and computer program products corresponding to the above-summarized exemplary embodiments are also described and claimed herein.

Additional features and advantages are realized through the techniques of exemplary embodiments of the present invention. Other embodiments and aspects of the invention are described in detail herein and are considered a part of the claimed invention. For a better understanding of the invention with advantages and features thereof, refer to the description and to the drawings.

BRIEF DESCRIPTION OF SEVERAL VIEWS OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the exemplary embodiments of the invention, together with advantages and features, by way of example with reference to the drawings.

DETAILED DESCRIPTION

Figure 1:
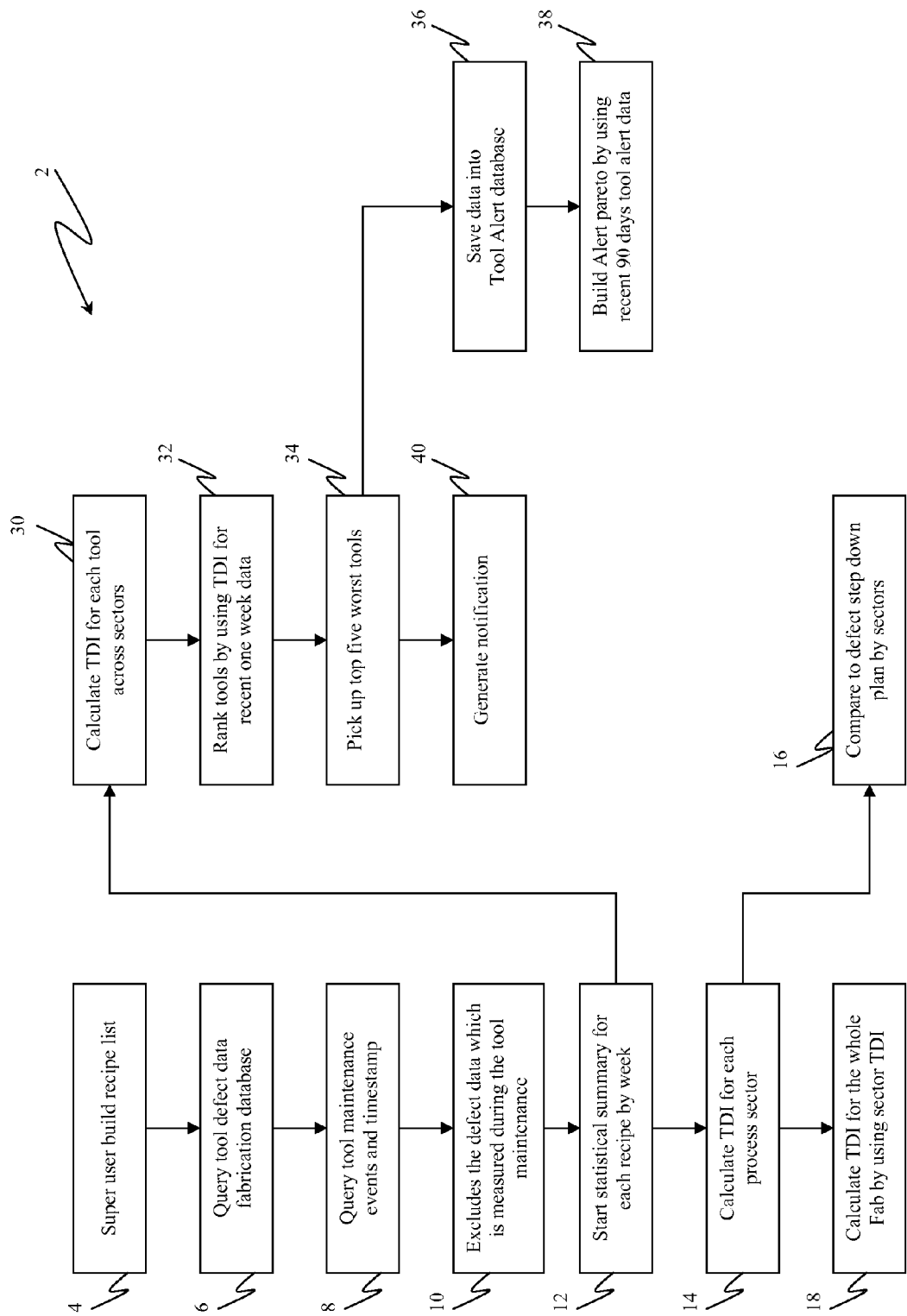
FIG. 1 is a flow chart illustrating a method of developing a process tool index in accordance with an exemplary embodiment of the invention.

With initial reference to FIG. 1, a method of establishing a tool defect index or TDI is indicated generally at 2. Initially, a superuser or process administrator builds a recipe list for a particular process sector of a production facility as indicated in block 4. The recipe list includes sampling data, tool setup data and the like for each tool in the process sector. Once the recipe list is populated, tool defect data for each tool identified in the recipe list is obtained from a fabrication database as indicated in block 6. After identifying tool defect data, tool maintenance events are obtained from a maintenance database as indicated in block 8. After identifying maintenance events for each tool in the process sector, defect data associated with each tool during tool maintenance is excluded from the recipe list as indicated in block 10. Once defect data associated with tool maintenance is removed from the recipe list, a statistical summary for each recipe is determined for each tool on a weekly basis in block 12. Once the weekly statistical summary is obtained, a TDI for each process sector is calculated for the production facility as indicated in block 14. The TDI for each process sector is compared against a defect step-down plan associated with each process sector as indicated in block 16. The defect stepdown plan includes data identifying targeted defect reduction goals for each process sector in the production facility. Once the TDI for each process sector is determined in block 14, the TDI for the entire production facility is calculated in block 18.

In addition to calculating the TDI for each process sectors and the entire production line, after calculating the statistical summary for each recipe in block 12, a TDI is determined for each tool in each process sector as indicated in block 30. At this point, the tools in each sector are ranked by descending TDIs for a particular week. That is, the TDI for each tool is calculated based on data received from a previous operating week and each tool in the process sector is ranked by descending TDI for the previous week as indicated in block 32. After ranking the tools by TDI, the five worst tools or the five tools having the highest TDI for the previous week are listed as indicated in block 34. The five worst tools are saved in a tool alert database in block 36 and an alert Pareto is generated using the recent 90-day tool alert data in block 38. In addition, after determining the top five worst tools in block 34, a notification is generated in block 40. As will be discussed more fully below, the notification includes a tool defect index for each tool along with a signal for representing a defect factor associated with each tool in a particular process sector. The defect factor is analyzed to determine whether steps can be taken to improve tool output that would have an overall improvement on wafer quality.

Figure 2:
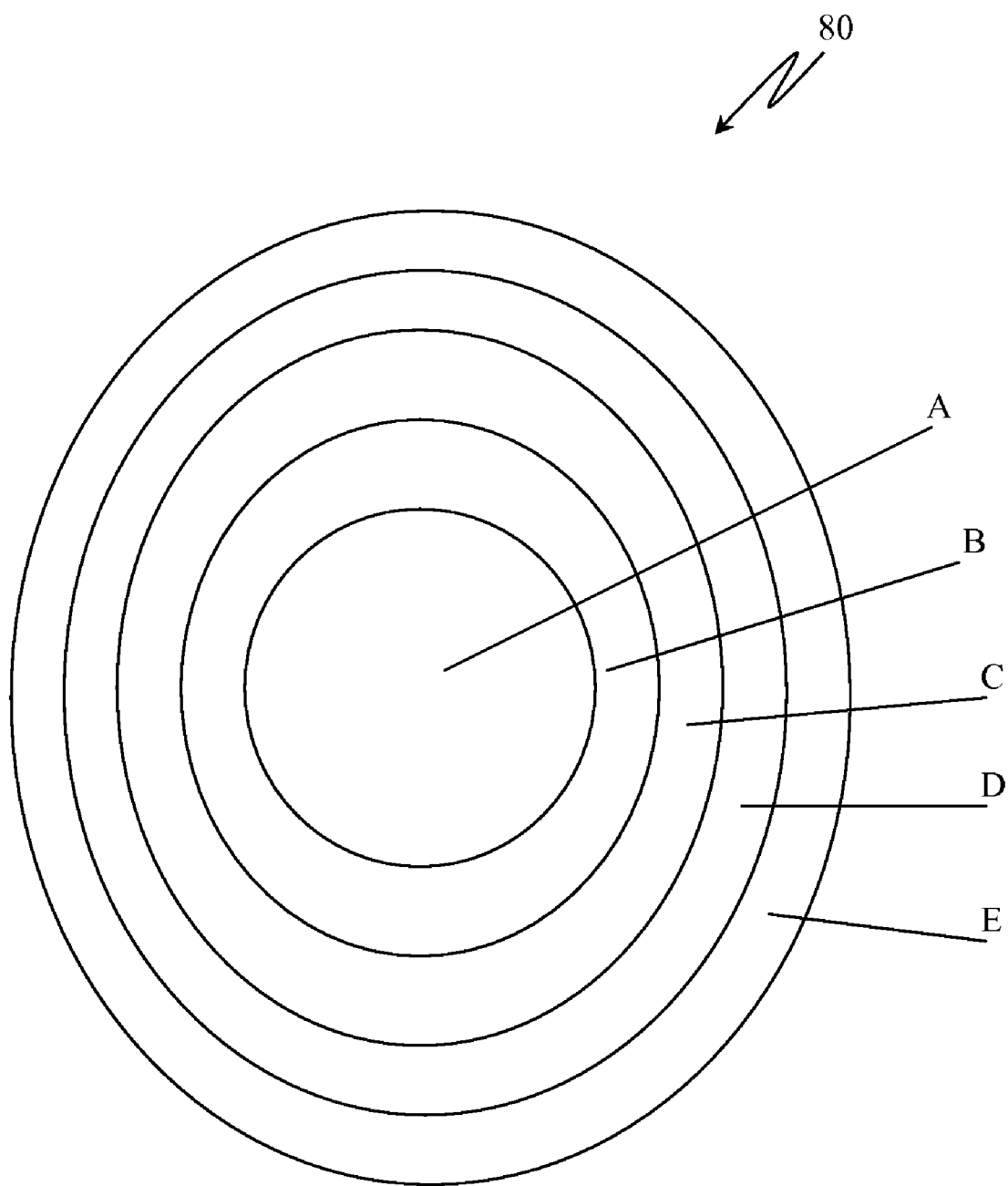
FIG. 2 is a schematic illustration of a semi-conductor wafer divided into a plurality of zones.
Figure 3:
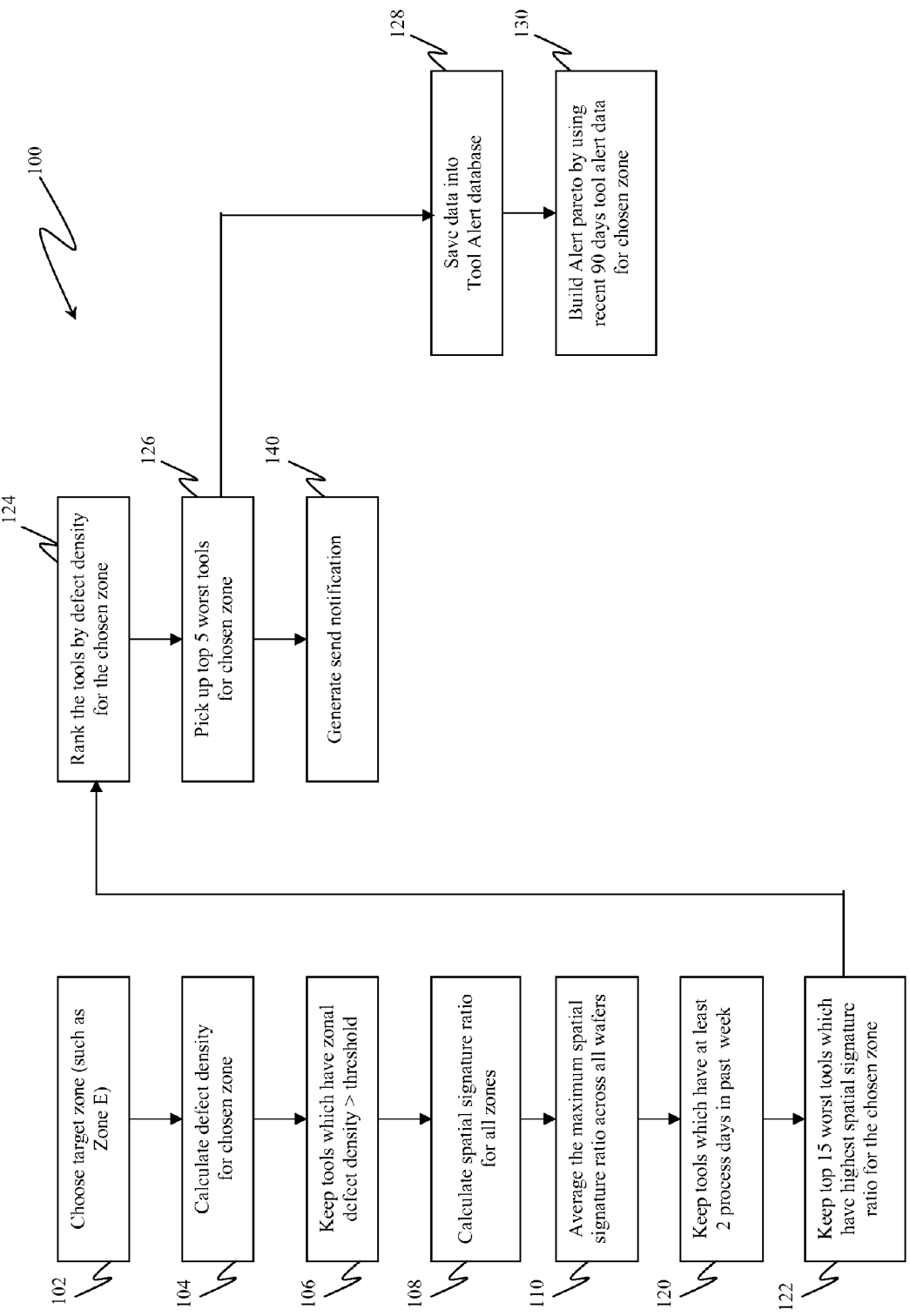
FIG. 3 is a flow chart illustrating a method of identifying zone of a semi-conductor wafer that have a negative impact on yield in accordance with an exemplary embodiment of the invention.

In addition to determining which tools have an affect on overall wafer quality, each wafer is divided into a plurality of zones, for example, zones A-E shown in connection with a wafer 80 illustrated in FIG. 2. Each zone A-E is scanned for defects and compared against adjacent zones as well as other wafers to determine whether defects in a particular zone have an impact on yield and, if so, identify the tool or tools that produce the defects. At this point, reference will be made to FIG. 3 in describing a method 100 of identifying wafer zones having defects that have a negative impact on yield. Initially, a wafer zone, such as zone E on wafer 80, is chosen in block 102. After choosing the particular zone, a defect density for the zone is calculated as indicated in block 104. Tools that have produce wafers having a zonal defect density that exceeds a zonal defect density threshold are isolated from tools having a defect density that is less than the defect density threshold as indicated in block 106. At this point, a spatial signature ratio is calculated for each wafer having a zonal defect density that exceeds the zonal defect density threshold as indicated in block 108. More specifically, defect density for each zone A-E is compared against adjacent zones A-E to determine whether the defect density in one zone is significantly higher than the defect density in the other zones.

Maximum spatial signature ratios are then averaged across all wafers to determine if the defect density in a particular zone is out of tolerance. Tools having at least two process days in a recent week are then isolated from all remaining tools in the process sector as indicated in block 120. At this point, the 15 worst tools, i.e. tools having producing wafer having the highest spatial signature ratio, are identified as indicated in block 122 and ranked by TDI as indicated in block 124. The top five worst tools, i.e., the tools producing wafers having out-of-tolerance zonal defects for the chosen zone are identified in block 126 and saved in a tool alert database as indicated in block 128. An alert Pareto is then developed using recent 90 day tool alert data for the chosen zone as indicated in block 130. In addition to developing the alert Pareto, after identifying the top 5 worst tools in block 126, a notification is automatically generated and passed to process sector supervisory personnel as indicated in block 140.

Figure 4:
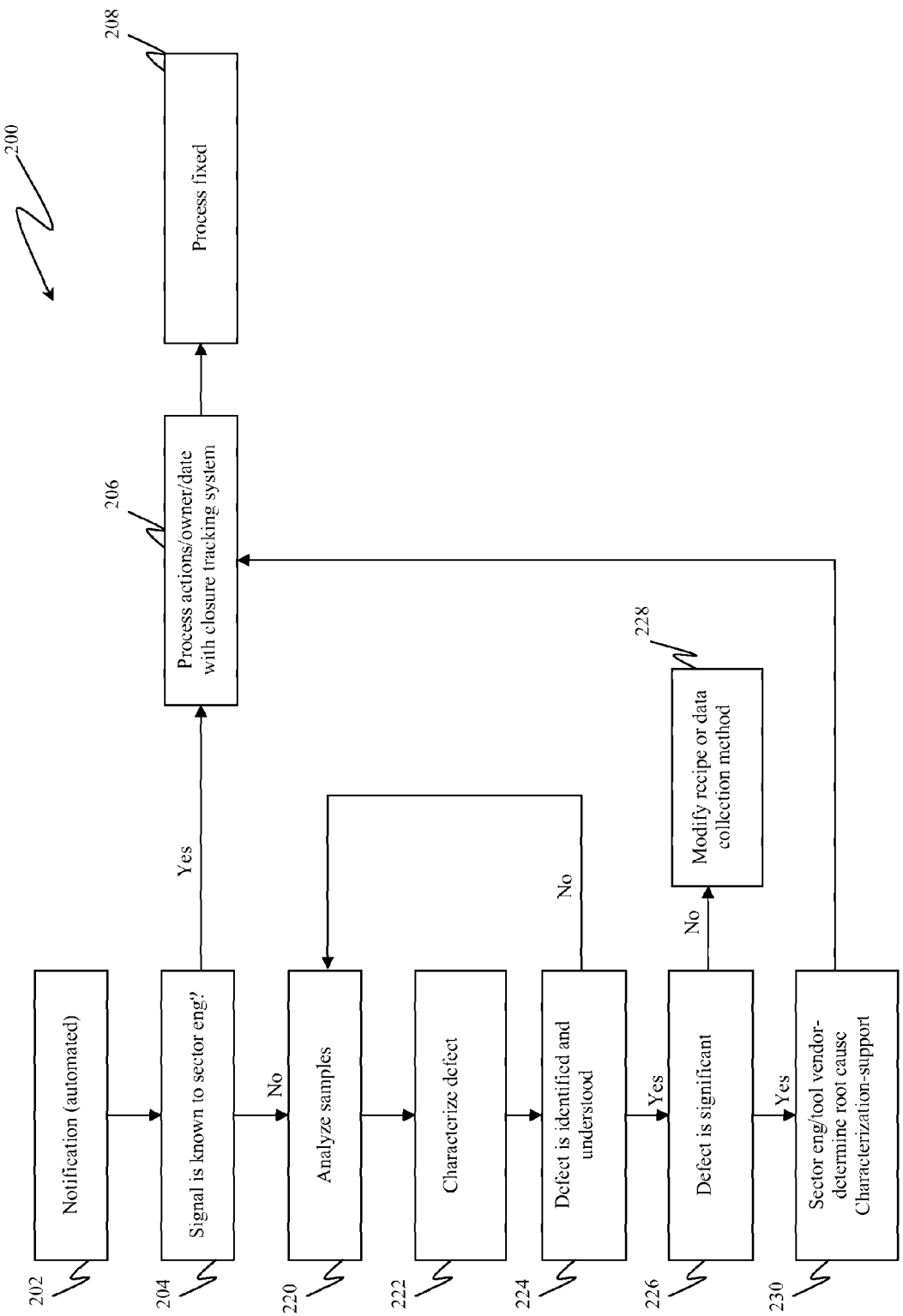
FIG. 4 is a flow chart illustrating a method of employing a tool defect index to monitor process sectors in a production facility.

Reference will now be made to FIG. 4 in describing a method of employing a tool defect index to monitor process sectors in a production facility as indicated generally at 200. Initially, a sector engineer or supervisor receives a notification or alert as indicated in block 202. The signal represents a defect factor associated with each tool in the process zone. The sector engineer evaluates the signal as indicated in block 204 to determine whether the signal is known, i.e. an existing issue, or whether the signal contains new issues that need to be addressed in the process sector as indicated in block 204. If the signal is known, a list of process actions, the owner, e.g., sector engineer, and date are entered into a tracking system as indicated in block 206 and, if no action is taken the tracking system is updated and the process sector is identified as being fixed as indicated in block 208.

If, however, there exists signals that are unknown to the sector engineer, samples are collected and analyzed from the tool or tools having an unknown signal as indicated in block 220. The signal samples are characterized i.e., size and height of defects are determined, an elemental analysis of the defect is analyzed, and/or a physical analysis, if necessary, is performed on the sample unit or monitor wafer as indicated in block 222. At this point, the defects are correlated to the signal to determine a root cause of any defects as indicated in block 224. If the root cause of the defect(s) is not understood, additional samples are collected and the monitor wafers further analyzed. However, if the signal is understood, i.e., the root cause of the defect is identified, a determination is made whether or not the defects are significant as indicated in block 226. If the defect is not significant, i.e. does not have a particularly significant impact on process yield, a sampling recipe for the particular tool is modified to represent the defect as indicated in block 228. If however, the signal is significant, the root cause of the signal is identified and characterized as indicated in block 230. At this point, any process actions taken to correct the root cause are noted in the tracking system as at block 206 and, as indicated above, if the process is corrected an indication of the correction is presented in block 208.

At this point, to be appreciated, the present invention provides a method and system of determining which tools in a process sector have an overall impact on process yield in a semiconductor production facility. Sector engineers can evaluate tools having a significant impact on production yield, and take corrective action to improve quality. In addition, the present invention provides process engineers an overall view of each process sector. That is, a tool defect analysis is determined for each process sector such that process engineers can determine which particular sector in a particular production facility is having a negative impact on yield. Finally, an overall tool defect analysis for the fabrication facility is also determined. In this manner, process engineers can drill down from an upper echelon i.e., production facility level to a lower echelon or tool level view to determine which aspects of an overall production facility are impacting yield and, take corrective action to improve overall production quality and yield.

Figure 5:
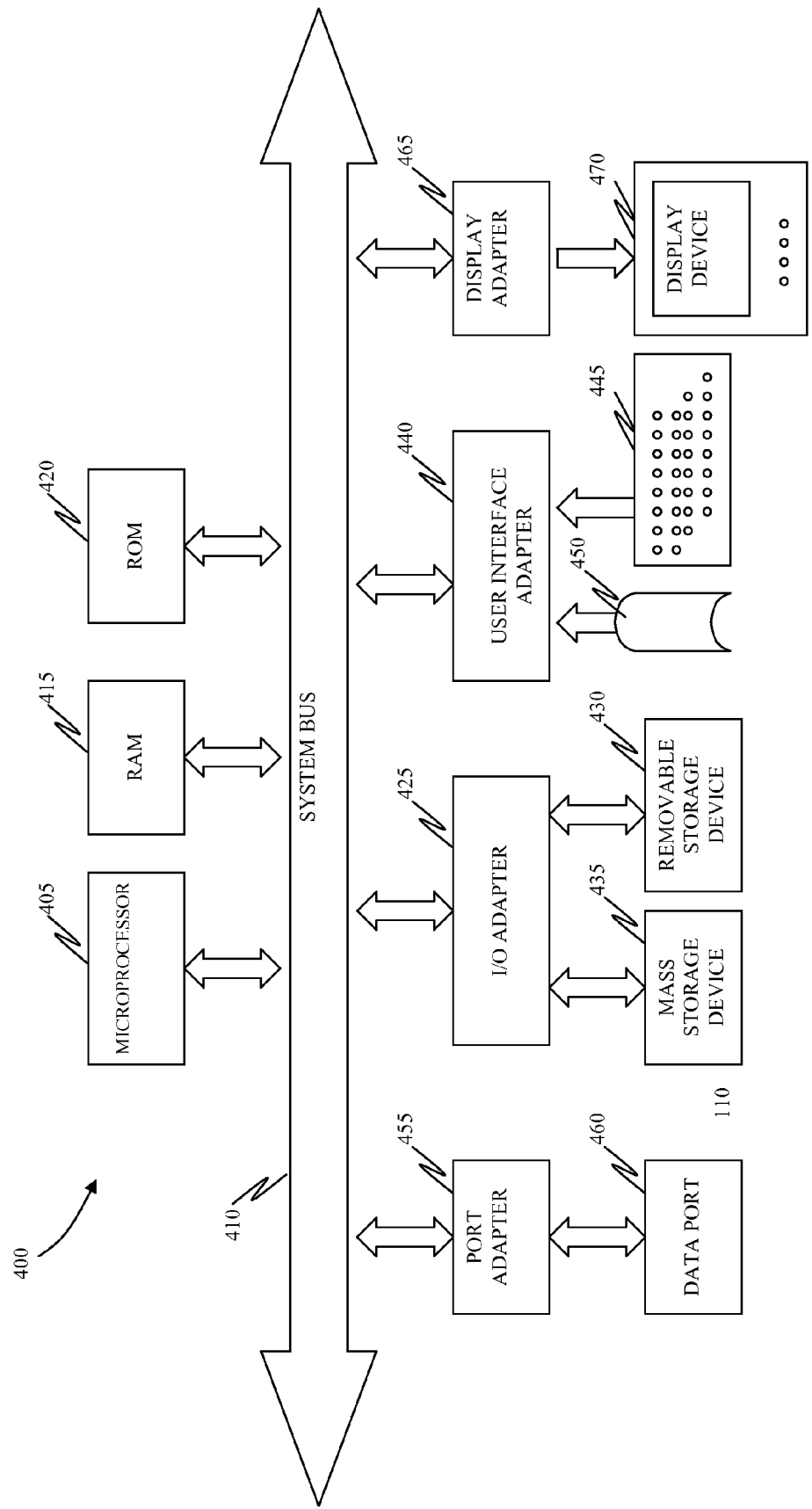
FIG. 5 is a schematic block diagram of a general-purpose computer suitable for practicing the present invention exemplary embodiments.

The capabilities of the present invention can be implemented in software, firmware, hardware or some combination thereof. As one example, the method of monitoring a process sector in a production facility described herein is practiced with a general-purpose computer and the method may be coded as a set of instructions on removable or hard media for use by the general-purpose computer. FIG. 5 is a schematic block diagram of a general-purpose computer suitable for practicing the present invention embodiments. In FIG. 5, computer system 400 has at least one microprocessor or central processing unit (CPU) 405. CPU 405 is interconnected via a system bus 410 to a random access memory (RAM) 415, a read-only memory (ROM) 420, an input/output (I/O) adapter 425 for a connecting a removable data and/or program storage device 430 and a mass data and/or program storage device 435, a user interface adapter 440 for connecting a keyboard 445 and a mouse 450, a port adapter 455 for connecting a data port 460 and a display adapter 465 for connecting a display device 470.

ROM 420 contains the basic operating system for computer system 400. The operating system may alternatively reside in RAM 415 or elsewhere as is known in the art. Examples of removable data and/or program storage device 430 include magnetic media such as floppy drives and tape drives and optical media such as CD ROM drives. Examples of mass data and/or program storage device 435 include hard disk drives and non-volatile memory such as flash memory. In addition to keyboard 445 and mouse 450, other user input devices such as trackballs, writing tablets, pressure pads, microphones, light pens and position-sensing screen displays may be connected to user interface 440. Examples of display devices include cathode-ray tubes (CRT) and liquid crystal displays (LCD).

A computer program with an appropriate application interface may be created by one of skill in the art and stored on the system or a data and/or program storage device to simplify the practicing of this invention. In operation, information for or the computer program created to run the present invention is loaded on the appropriate removable data and/or program storage device 430, fed through data port 460 or typed in using keyboard 445.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method of monitoring a process in a semiconductor production facility, the method comprising:
    establishing a tool defect index associated with a process sector in a semiconductor production facility, the tool defect index including a signal representing a defect factor associated with at least one tool in the process sector;
    determining whether the defect factor associated with the at least one tool is a known defect factor or an unknown defect factor;
    analyzing at least one wafer from the at least one tool if the defect factor associated with the at least one tool is an unknown defect factor by dividing the at least one wafer into a plurality of zones and analyzing at least one of the plurality of zones for a zonal defect density;
    identifying at least one defect on the at least one wafer from the at least one tool;
    establishing that the at least one defect is a defined significant defect;
    determining a cause of the at least one significant defect; and
    creating an alert indicating that the at least one tool associated with the process sector is producing wafer having at least one defined significant defect.

2. The method of claim 1, wherein analyzing wafer from the at least one tool includes determining a size and height of any defects.

3. The method of claim 1, further comprising: determining a spatial signature ratio for the at least one wafer to determine whether the zonal defect density exceeds a zonal defect density tolerance for the at least one unit.

4. The method of claim 1, further comprising: establishing at least one tool defect index for a plurality of tools associated with the process sector to create a plurality of tool defect indexes.

5. The method of claim 4, further comprising: ranking the plurality of tool defect indexes.

6. The method of claim 1, further comprising: identifying a worst tool for the production sector based on the tool defect index associated with each tool.

7. The method of claim 1, further comprising: establishing a tool defect index for an entire production facility.

8. The method of claim 1, further comprising: modifying a sampling recipe associated with the at least one tool if the defect is not a significant defect.

9. A system for monitoring a process sector in a production facility comprising:
    a central processing unit (CPU), said CPU being interconnected functionally via a system bus to:
        an input/output (I/O) adapter connecting to at least one of a removable data storage device, a program storage device, and a mass data storage device;
        a user interface adapter connecting to one or more computer input devices;
        a display adapter connecting to a display device; and
        at least one memory device thereupon stored a set of instructions which, when executed by said CPU, causes said system to:
            establish a tool defect index associated with a process sector in a production facility, the tool defect index including a signal representing a defect factor associated with at least one tool in the process sector;
            determine whether the defect factor associated with the at least one tool is a known defect factor or an unknown defect factor;
            analyze at least one unit from the at least one tool if the defect factor associated with the at least one tool is an unknown defect factor by dividing the at least one wafer into a plurality of zones and analyzing at least one of the plurality of zones for a zonal defect density;
            identify at least one defect on the at least one unit from the at least one tool;
            establish that the at least one defect is a defined significant defect;
            determine a cause of the at least one significant defect; and
            create an alert indicating that the at least one tool associated with the process sector is producing units having at least one defined significant defect.

10. The system of claim 9, wherein the set of instructions which, when executed by said CPU, causes said system to: determine a size and height of any defects when analyzing the at least one unit.

11. The system of claim 9, wherein the set of instructions which, when executed by said CPU, causes said system to: establish at least one tool defect index for a plurality of tools associated with the process sector to create a plurality of tool defect indexes.

12. The system of claim 11, wherein the set of instructions which, when executed by said CPU, causes said system to: rank the plurality of tool defect indexes.

13. The system of claim 9, wherein the set of instructions which, when executed by said CPU, causes said system to: identify a worst tool for the production sector based on the tool defect index associated with each tool.

14. The system of claim 9, wherein the set of instructions which, when executed by said CPU, causes said system to: establish a tool defect index for an entire production facility.

15. The system of claim 9, wherein the set of instructions which, when executed by said CPU, causes said system to: modify a sampling recipe associated with the at least one tool if the defect is not a significant defect.

16. A computer program product comprising:
    a computer useable medium including a computer readable program, wherein the computer readable program when executed on a computer causes the computer to:
        establish a tool defect index associated with a process sector in a production facility, the tool defect index including a signal representing a defect factor associated with at least one tool in the process sector;
        determine whether the defect factor associated with the at least one tool is a known defect factor or an unknown defect factor;
        analyze at least one unit from the at least one tool if the defect factor associated with the at least one tool is an unknown defect factor by dividing the at least one wafer into a plurality of zones and analyzing at least one of the plurality of zones for a zonal defect density;

identify at least one defect on the at least one unit from the at least one tool;

establish that the at least one defect is a defined significant defect;

determine a cause of the at least one significant defect; and create an alert indicating that the at least one tool associated with the process sector is producing units having at least one defined significant defect.

17. The computer program product according to claim 16, wherein the computer readable program when executed on a computer causes the computer to: establish at least one tool defect index for a plurality of tools associated with the process sector to create a plurality of tool defect indexes.

18. The computer program product according to claim 17, wherein the computer readable program when executed on a computer causes the computer to: rank the plurality of tool defect indexes.

19. The computer program product according to claim 16, wherein the computer readable program when executed on a computer causes the computer to: identify a worst tool for the production sector based on the tool defect index associated with each tool.

* * * * *